United States Patent
Hanchett et al.

(10) Patent No.: US 10,524,485 B2
(45) Date of Patent: Jan. 7, 2020

(54) FOOD PRODUCTS CONTAINING A MODIFIED WAXY CASSAVA STARCH

(71) Applicant: Corn Products Development, Inc., Westchester, IL (US)

(72) Inventors: Douglas J. Hanchett, Bridgewater, NJ (US); Christina Odorisio, Bridgewater, NJ (US)

(73) Assignee: Corn Products Development, Inc., Westchester, IL (US)

(*) Notice: Subject to any disclaimer, the term of this patent is extended or adjusted under 35 U.S.C. 154(b) by 0 days.

(21) Appl. No.: 16/240,879

(22) Filed: Jan. 7, 2019

(65) Prior Publication Data

US 2019/0142023 A1    May 16, 2019

Related U.S. Application Data

(63) Continuation of application No. 14/788,893, filed on Jul. 1, 2015, now Pat. No. 10,172,368.

(60) Provisional application No. 62/037,852, filed on Aug. 15, 2014.

(51) Int. Cl.
*A23C 9/137* (2006.01)
*A23L 29/219* (2016.01)

(52) U.S. Cl.
CPC ............ *A23C 9/137* (2013.01); *A23L 29/219* (2016.08)

(58) Field of Classification Search
CPC ...... A23C 9/137; A23L 29/219; A23L 29/137
USPC ......................................................... 426/583
See application file for complete search history.

(56) References Cited

U.S. PATENT DOCUMENTS

| 6,777,015 B2* | 8/2004 | Carver ...................... C08L 3/00 426/578 |
| 2003/0094104 A1* | 5/2003 | Jeffcoat .................. A61K 8/732 99/485 |
| 2003/0108649 A1* | 6/2003 | Jeffcoat .................. C08B 30/00 426/578 |

FOREIGN PATENT DOCUMENTS

| CN | 102603904 A | 7/2012 |
| CN | 103262932 A | 8/2013 |
| CN | 103416642 A | 12/2013 |
| CN | 103987273 A | 8/2014 |
| EP | 1566106 | 5/2003 |
| EP | 2014177 A1 | 7/2008 |
| GB | 1462884 A | 1/1977 |
| JP | 4523668 * | 8/2010 ............... A23L 9/10 |
| JP | 2011092087 A | 5/2011 |
| JP | 4880081 B1 | 2/2012 |

OTHER PUBLICATIONS

Sajilata, et al., Specialty Starches for Snack Foods, Carbohydrate Polymers, 2005 www.sciencedirect.com.
Sasikunya, et al., Effect of Modified Tapioca Starch on the Stability of Fish Mince Gels Subjcted to Multiple Freeze-Thawing, Journal of Muscle Food 2010.
Sun, et al., Effects and mechanism of modified starches on the gel properties of myofibrillar protein from grass carp, Intl Journal of Biological macromolecules, 2013.
David John Thomas; William A. Atwell, Starches: (practical guides for the food industry), Eagan Press, 1999, Table 1-2, p. 6.

* cited by examiner

*Primary Examiner* — Jeffrey P Mornhinweg
(74) *Attorney, Agent, or Firm* — Jacqueline Cohen; Jason Grauch; Rachael Casey

(57) ABSTRACT

A food product composition containing a dairy ingredient and having an aqueous phase comprised of a waxy cassava acetyl-substituted inhibited starch in an amount effective to thicken said aqueous phase, such as a yogurt, is provided. A method of making such a food product is also provided.

10 Claims, No Drawings

FOOD PRODUCTS CONTAINING A MODIFIED WAXY CASSAVA STARCH

BACKGROUND OF THE INVENTION

The present invention relates to food products and to their methods of preparation. More particularly, the present invention relates to food products, including dairy products, especially cultured or fermented dairy products such as yogurt and to their methods of preparation.

Yogurt is a nutritious dairy product which recently has become quite popular. At retail, yogurt is now available in a wide assortment of varieties of texture, fat content and flavor among other attributes. Other than aseptically packaged yogurt, yogurt is traditionally distributed and consumed with a live culture which requires refrigerated distribution.

From a yogurt manufacturing process standpoint, all fruit containing yogurts fall into one of two styles; namely, 1) set yogurts, and 2) stirred style. Within these broad two classifications, numerous yogurt varieties exist.

In the set style, the "yogurt" is charged to its container and allowed to set or increase in viscosity and/or ferment. Usually, an inoculated milk base is charged to the container and allowed to ferment in situ at warm temperatures of about 40° C. to about 50° C. After the desired maturing time, the product is cooled which arrests the culturing activity and also allows the body to set to form the gel-type texture. Set style yogurts have a relatively low initial viscosity (i.e., upon filling of its food package container) and a higher temperature ("temperature of filling") compared to the viscosities of stirred style yogurt products. As the product cools and ferments, its viscosity increases to its final viscosity value. A set style yogurt is characterized by a more firm, gel-like consistency and a higher final viscosity than most stirred style yogurts. In addition to the natural thickening effect of the yogurt culture, a wide variety of thickeners and stabilizers are taught as useful to supplement the yogurt's gel characteristics.

Of course, within this set style, there is a continuum of body firmness. Most set custard style products have quite firm gels although some others are much softer. One variety of a set style yogurt is a "custard" style yogurt. The softer gel products may even be perceived by the consumer as being thinner than even current stirred style products.

One popular style variant of custard style yogurt is fruit-on-the-bottom, also colloquially referred to as "sundae" style, in which a discrete layer of fruit preserves is on the bottom of the yogurt container and the custard yogurt fills the rest of the container. The fruit preserves have a higher density than the yogurt. Since the yogurt in set style products is still liquid upon charging to the container, the relatively more dense fruit preserves are thus then generally charged first to the container at its bottom and the lighter liquid unset yogurt added thereupon. The yogurt is then allowed to ferment, cool, and set on the top of the fruit preserve. Fruit on the top style products are similarly prepared, except that the containers are typically inverted after having been allowed to set. Typically, the yogurt phase is unflavored, although occasionally sweetened, and of a white or natural color. This white color is in contrast to the separate fruit preserve layer which often contains additional coloring supplemental to that coloring provided by the ingredients of the fruit preserves. Other than for moisture equilibration, the yogurt layer and the fruit preserve layer usually do not intermix over time due to specific growth difference and the binding effect of pectin in the fruit preserves.

Still another variation of the custard style yogurt is what has sometimes colloquially been referred to as "western" or "California" style yogurt which generally is a custard style yogurt with a discrete layer of fruit preserves on the bottom, but wherein the custard yogurt additionally contains a water soluble, natural colorant corresponding to the color of the fruit preserves. Thus, in a product having a strawberry fruit preserve bottom layer, the custard yogurt layer or phase may additionally comprise modest levels of red colorant sufficient to give the yogurt phase a pink color complimentary of the red fruit preserve layer. Frequently, both phases have added water soluble colorants.

In the second general category of yogurt products, the yogurt is of a stirred type. In stirred yogurts, the yogurt is fermented in bulk prior to filling the individual food package container. Thus, the stirred style yogurt typically has a higher viscosity than set style yogurts upon filling due to the lower temperature and the thickening effect of yogurt culture. Nonetheless, the stirred style yogurt typically builds or increases substantially in viscosity after filling over time until reaching its intended finish viscosity. Of course, stirred yogurts also come in various styles and product variations.

Most commonly, fruit preserves or purees are stirred into the stirred yogurt. Such stirred style yogurts comprising intermixed fruit purees are sometimes referred to most frequently as "Swiss" style or, less frequently but equivalently as "Continental" or "French" style. Occasionally, stirred Swiss style yogurts are formulated with excessive amounts of stabilizers with the result that after upon refrigerated storage for 48 hours, the yogurt possesses a solid-like consistency, somewhat reminiscent of custard style yogurt. Such texturally similar products generally result when one manufacturer (whose plants are designed to produce one type of yogurt) desires to produce a product competing with another manufacturer (whose plant is designed to produce the other yogurt type).

More recently, a variation of Swiss style has been marketed that additionally comprises an admixture of nuts and/or partially puffed cereal grains uniformly dispersed through the yogurt. This yogurt mixture is sometimes referred to as "breakfast" style yogurt. The partially puffed grains and nut pieces give a pleasingly mixed organoleptic texture which is both chewy and crunchy in addition to the creamy mouth-feel of stirred yogurt.

Notwithstanding the descriptions of styles given above, such characterizations are only generalizations. Thus, occasionally the prior art will contain a description of, e.g., "western" style yogurt which description may not be exactly as described above. However, the various style names used herein will refer to variants as described above.

SUMMARY OF THE INVENTION

In one aspect, this invention relates to a food product composition comprising a dairy ingredient and an aqueous phase comprised of a waxy cassava acetyl-substituted adipate-cross-linked starch in an amount effective to thicken said aqueous phase, wherein said waxy cassava acetyl substituted adipate cross-linked starch has greater than about 0.09% by weight adipate groups by weight of the starch.

In another aspect, this invention relates to a method of making a food product composition comprised of a dairy ingredient and an aqueous phase, the method comprising mixing with a dairy ingredient a waxy cassava acetyl-substituted adipate cross-linked starch in an amount effective to thicken said aqueous phase, wherein said waxy cassava acetyl substituted adipate cross-linked starch has greater than about 0.09% by weight adipate groups by weight of the starch.

DETAILED DESCRIPTION OF THE INVENTION

The products of the present invention typically comprise a casein based high moisture or high water activity material in the form of a thickened fluid, especially yogurt. Yogurt, of course, is well known and the art is replete with teachings of useful yogurt compositions and preparation techniques. The skilled artisan will have no difficulty selecting suitable yogurt compositions and preparation methods for use in the present invention. A good general description of yogurt manufacture is given in U.S. Pat. No. 4,797,289 (issued Jan. 10, 1989 to Reddy), which is incorporated herein by reference.

Very generally, however, yogurt comprises a cultured milk product produced by culturing one or more dairy ingredients that are combined to form a yogurt base with a characterizing bacterial culture containing *Lactobacillus bulgaricus*, a lactic acid-forming rod-shaped bacterium, and *Streptococcus thermophilus*, a coccus-shaped bacterium able to grow and produce lactic acid at high temperatures. The culture may optionally comprise additional culture specie(s) as is known in the art such as *Lactobacillus acidophilus* and/or *bifidus*.

Yogurt products are further described in those current U.S. Food & Drug Administration standards of identity for refrigerated yogurt that were promulgated in September 1982, effective Jul. 1, 1985, specifically 21 Code of Federal Regulations .sctn.131.200, 0.203 and 0.206.

The dairy ingredients which collectively comprise the yogurt base are first blended to form a yogurt base and optionally deaerated, heated and homogenized. The yogurt base is then essentially pasteurized at high temperatures and then cooled to culturing temperatures of about 40° C. to about 50° C. (about 110° F.). Thereafter, the pasteurized, cooled yogurt base so formed is then inoculated with the culture and then fermented to a desired acid content or titratable acidity and pH, e.g., 4.1 to 4.7, at which curdling or coagulation occurs which forms the yogurt. Acid development and bacterial growth are then arrested by cooling the mixture, generally to a filling temperature of about 0° C. to about 15° C., typically 0° C. to 5° C. and storing at these refrigeration temperatures.

As can be appreciated from the above general description, the process for the preparation of stirred style yogurt differs from that of the preparation of custard style in that the fermentation step is practiced prior to packaging, typically in large vessels with very mild agitation.

Formulating a Yogurt Base

The first step of one particular embodiment of yogurt product preparation is formulating a particular or "standardized" yogurt base. The finished yogurt can vary in known manner in fat content and the yogurt base can optionally include specific formulations so as to provide nonfat (i.e., less than 0.5% butterfat), low fat (i.e., about 1.5% fat), reduced fat (about 2% fat), or full fat (about 3.5% fat) yogurts. The yogurt base can thus include such dairy ingredients such as whole milk, partially skimmed milk, skim milk, nonfat dry milk and the like. The yogurt base, before the addition of bulky flavors and/or sweeteners, contains about 0.1% to 4% milkfat and not less than 12% milk-solids-not-fat ("MSNF"), and has a titratable acidity of not less than 0.9%, expressed as lactic acid.

Milk of various mammals is used for yogurt making in various parts of the world. However, most of the industrialized production of yogurt uses cow's milk. The fortification of milk-solids-not-fat fraction concentration to about 12% from milk native levels is conveniently accomplished with added nonfat dry milk or condensed skim milk. The yogurt base can also comprise other milk types as an ingredient such as partially defatted milk, condensed skim milk, cream, and nonfat dry milk. In rare practice, milk may be partly concentrated by removal of 15% to 20% water in a vacuum pan or other physical means. Supplementation of milk-solids-not-fat with nonfat dry milk is the typical industrial procedure. The increased protein content in the mix results in thicker consistency following the fermentation period.

Optionally, the yogurt base can comprise, and the requisite level of MSNF can include such other milk fraction ingredients as buttermilk, whey, lactose, lactalbumins, lactoglobulins, or whey modified by partial or complete removal of lactose and/or minerals, to increase the nonfat solids content, provided, that the ratio of protein to total nonfat solids of the food, and the protein efficiency ratio of all protein present shall not be decreased as a result of adding such ingredients.

The yogurt comprises a thickening amount of a waxy cassava acetyl-substituted inhibited starch, e.g. a waxy cassava acetyl-substituted distarch adipate ("waxy cassava ASDA") as an essential component of a stabilizer system. The yogurt base typically comprises about 1.0% to about 4% by weight, more typically about 1.5% to 3.0% of the starch, and even more typically about 2% to about 2.5%.

Methods of making waxy cassava ASDAs that are useful in the process and compositions of the invention are described in detail in EP 1314743A2 (Jeffcoat et al.), the disclosure of which is incorporated by reference herein. Waxy cassava starches, also known as low amylose tapioca starches (regionally cassava and tapioca may also be known as manioc, manioca, yucca, or mandioc), may be obtained by the method of U.S. Pat. Nos. 7,022,836; 6,551,827; and 6,982,327 (Visser et al.), herein incorporated in their entirety by reference. Also included in this invention are low amylose tapioca starches derived from low amylose cassava plants which may now be found in nature, obtained by standard breeding and crossbreeding technique (i.e. non-GMO), or obtained by translocation, inversion, transformation or any other method of gene or chromosome engineering to include variations thereof, whereby the properties of the starch of this invention are obtained. In addition, starch extracted from a plant grown from artificial mutations and variations of the above generic composition which may be produced by known standard methods of mutation breeding is also applicable herein. By "waxy cassava" is meant a starch which has an amylose content substantially lower than that of regular tapioca starch, particularly less than about 10%, more particularly less than about 5%, and most particularly less than about 3% amylose by weight.

The native waxy cassava starch can be cross-linked using mixed adipic and acetic anhydride reagents. Such reagents and the crosslinking reaction are well known in the art for making distarch adipates using other native starches. Distarch adipates, prepared by crosslinking with mixed adipic and acetic anhydride reagents, and the methods of producing them are also known in the art. The mixed anhydride reagent used creates organic ester linkages that are relatively stable under many typical processing conditions. See for example U.S. Pat. No. 2,461,139 (Caldwell).

For example, the waxy cassava distarch adipates may be prepared by reacting starch in an aqueous slurry with an adipic/acetic mixed anhydride reagent. The bound acetyl of the resultant starch may be adjusted by one skilled in the art to any level necessary for the amount of stability desired, particularly in the range of up to about 2.5% bound acetyl of the waxy cassava inhibited starch. The amount of adipic/acetic mixed anhydride used in the reaction may also be adjusted by one skilled in the art to provide the desired inhibition effect (degree of crosslinking) in the resultant starch. Typically, the amount of mixed anhydride used is greater than about 1%. Up to 4% acetic anhydride may be used for stabilization (mono-substitution) to provide maximum stability. This typically yields about 2.5% bound acetyl. One of ordinary skill will be able to routinely adjust reaction efficiency of the acetylation process one employs based on the amount of acetic anhydride used. The bound acetyl of the waxy cassava inhibited starch will typically range from 0.1%, more typically 0.25% up to just less than about 2.5% by weight, more typically from about 0.5% to about to about 2%, and even more typically from about 1% to just less than about 2%.

The amount of adipate cross-linking will be greater than 0.090 wt % adipate based on the weight of the waxy cassava starch, and will typically be at least about 0.10 wt %. Typically, the amount of adipate cross-linking will be from about 0.10 to about 0.18 wt %, and more typically from about 0.12 to about 0.16 wt % adipate based on the weight of the waxy cassava starch.

As an alternative to adipate cross-linking, other food-acceptable chemical cross-linkers can be used. Examples of other chemical cross-linkers include other linear dicarboxylic acid anhydrides, citric acid, phosphorus oxychloride, and trimetaphosphate salts. The amount of cross-linking agent necessary to give a suitable product will depend upon the desired functionality of the starch. Methods to obtain such functionality by crosslinking are well known in the art and will vary depending, inter alia, on the type of cross-linking agent employed, the concentration of the cross-linking agent, the reaction conditions, and the necessity for having a cross-linked starch. Typically, this amount will range from about 0.001 to about 10.0% by weight of the starch. The typical range for adipate cross-linking is noted above. From these ranges, the corresponding amounts of other cross-linking agents to obtain equal levels of inhibition can be determined by one of ordinary skill without undue experimentation based on actual and observed cross-linking efficiencies.

As an alternative to chemical cross-linking or in addition to chemical cross-linking, the waxy cassava acetyl-substituted starches can be physically (e.g. thermally) inhibited, before or after acetylation and/or cross-linking. An example of the methods of thermal inhibition that will be useful are found in U.S. Pat. No. 6,261,376 (Jeffcoat, et al.), the disclosure of which is incorporated herein by reference in its entirety.

The thermal inhibition process of the '376 patent comprises the steps of (a) optionally pH adjusting a granular starch to a pH of about 7.0 or above; (b) dehydrating the starch until it is anhydrous or substantially anhydrous; and (c) heat treating the dehydrated starch or flour at a temperature and for a period of time sufficient to inhibit, the starch or flour and preferably render it non-cohesive. As used herein, "substantially anhydrous" means containing less than 1% moisture by weight.

Typically, the granular starch is slurried in water, optionally the pH is adjusted to neutral or greater by the addition of a base, and the starch is dried to about 2-15% moisture. The dried granular starch is then thermally inhibited by dehydrating the starch to anhydrous or substantially anhydrous and then heat treating the dehydrated starch. The length of time and temperature of heating will be adjusted to obtain a starch having a degree of inhibition similar to the adipate cross-linked waxy cassava starches described above. The resulting granular thermally-inhibited starch is then acetylated as described herein and, optionally further inhibited by cross-linking.

The dehydration may be a thermal dehydration or a non-thermal dehydration. The thermal dehydration is carried out by heating the starch in a convention oven or a microwave oven, or any other heating device for a time and at a temperature sufficient to reduce the moisture content to less than 1%, preferably 0%. Examples of non-thermal dehydrating methods include extracting the water from the granular starch using a hydrophilic solvent such as an alcohol (e.g., ethanol) or freeze drying the starch.

The typical pH is at least 7, most typically greater than pH 8, more typically pH 7.5-10.5, and even more typically 8-9.5. At a pH above 12, gelatinization more easily occurs; therefore, pH adjustments below 12 are more effectual.

Buffers, such as sodium phosphate, may be use to maintain pH if needed. An alternative method of raising the pH consists of spraying a solution of a base onto a granular or pregelatinized starch until the starch attains the desired pH, either during or prior to the thermal inhibition steps. If the starch is not going to be used in a food, any suitable inorganic or organic base can be used to raise the pH of starch. Another method consists of infusing etc. It should be noted that the textural and viscosity benefits of the thermal inhibition process tend to be enhanced as the pH is increased, although higher pHs tend to increase browning of the starch during the heat treating step.

In one embodiment, the yogurt produced using a waxy cassava ASDA as the sole thickener will exhibit stability over at least 6 weeks of aging, as that test is described in detail below.

Optionally, the yogurt base can additionally comprise modest amounts of additional supplemental stabilizers. Useful optional stabilizers can include gelatin, gum acacia, carrageenan, gum karaya, pectin, gum Tragacanth, xanthan, and mixtures thereof. The precise levels of use for the gums will depend upon a variety of factors. Most importantly, supplemental stabilizer selection and usage level is dependent upon the filling viscosity range for the yogurt as described in detail below. Good results can be obtained when the supplemental stabilizers are employed at collective usage levels ranging from about 0.1% to 2%.

These supplemental stabilizers are well known food ingredients and are commercially available. A good description of stabilizers is found in "Industrial Gums, Polysaccharides and Their Derivatives," 2nd Ed., ed by Roy L. Whistler et al., 1973 Academic Press. (See also "Gums and Stabilizers for the Food Industry," edited by Glyn O. Phillips et al., 1988 IRL Press.

The yogurt base can optionally further comprise a nutritive carbohydrate sweetening agent(s). Exemplary useful nutritive carbohydrate sweetening agents include, but are not limited to, sucrose, high fructose corn syrup, dextrose, various DE corn syrups, beet or cane sugar; invert sugar (in paste or syrup form); brown sugar, refiner's syrup; molasses (other than blackstrap); fructose; fructose syrup; maltose; maltose syrup, dried maltose syrup; malt extract, dried malt extract; malt syrup, dried malt syrup, honey; maple sugar, except table syrup and mixtures thereof.

These nutritive sweeteners exert osmotic pressure in the system, leading to progressive inhibition and decline in the rate of acid production by the culture. Being a colligative property, the osmotic based inhibitory effect would be directly proportional to concentration of the sweetener and inversely related to the molecular weight of the solute. In this regard, solutes inherently present in milk solids-non-fat part of yogurt mix accruing from starting milk and added milk solids and whey products would also contribute toward the total potential inhibitory effect on yogurt culture growth.

The yogurt base can optionally additionally comprise modest levels of whey protein concentrate ("WPC"). Especially useful herein are those WPC's that are low in lactose content, i.e., having a protein content of greater than 34% and typically greater than 50% by weight. If present, WPC can be included at levels ranging from about 0.1% to 5% by weight.

Good results in terms of balancing desired sweetness against yogurt growth inhibitory effects are obtained when the added nutritive carbohydrate sweetening agent level is between about 8% to 14%, typically about 10% to 12% and, more typically, about 12% of the overall sweetened yogurt.

The various dry ingredients, typically pre-blended, and wet ingredients are blended together to form an homogeneously blended yogurt base.

The yogurt base can then optionally be deaerated and homogenized. Certain highly typical method embodiments herein do not require deaeration. In highly typical embodiments, the yogurt base is heated to about 150° F. to 160° F. prior to homogenization to improve the effectiveness of the homogenization step.

Pasteurization and Cooling

Thereafter, whether or not deaerated, heated and homogenized as in the typical practice, the present yogurt preparation methods further comprise the typical step of pasteurizing the yogurt. As is well known, pasteurization is a temperature and time dual parameter process. Typical conditions herein to pasteurize the yogurt base are to heat the yogurt base to about 190° F. for about five minutes, although other pasteurization conditions and times can also be used. Thereafter, the pasteurized yogurt base is rapidly cooled to culturation temperatures in preparation for preparing the yogurt.

Inoculating and Fermenting

The next typical step in the present yogurt preparation is culturation of the pasteurized yogurt base. The culturation step includes the two substeps of inoculation or adding a live yogurt culture to form an inoculated yogurt base and then fermenting or incubating the inoculated yogurt base. For good results, about 2% to 6%, typically about 3% to 5%, of the yogurt culture is added to form the yogurt.

The medium for bulk starter production in most yogurt plants is antibiotic-free, nonfat dry milk reconstituted in water at 10% to 12% solids level. The starter medium is not generally fortified with growth activators like yeast extract, beef extract, protein hydrolysates because they tend to impart undesirable flavor to the starter and eventually yogurt. Following reconstitution of nonfat dry milk in water, the medium is heated to 90° to 95° C. (194° to 203° F.) and held for 30 to 60 minutes. Then the medium is cooled to 43° C.+/−2° (110° F.) in the vat. The frozen can is thawed by placing the can in cold or lukewarm water containing low levels of sanitizer until the contents are partially thawed.

The inoculated yogurt base (e.g., 95% yogurt base, 5% added culture) is then incubated to allow the live yogurt culture to ferment to form the yogurt. The incubation period for yogurt ranges from 4 to 6 hours and at temperatures of 100° to 115° F. (about 43° C.). The fermentation must be quiescent (lack of agitation and vibrations) to avoid phase separation in the yogurt base following incubation. The progress of fermentation is monitored by titratable acidity ("T.A.") measurements at regular intervals until the desired final acidity is obtained.

Mixing

Thereafter, the yogurt is then typically mixed to form a stirred style yogurt. The mixing can be performed either partially or fully, either before or after a cooling arrest step. The mixing step is intended to blend the yogurt to impart a smooth texture and mouthfeel to the yogurt body. In those certain typical embodiments employing a high potency sweetener, this step typically further essentially includes a substep of adding a high potency sweetener prior to cooling. By adding the high potency sweetener (e.g., aspartame, acetylsulfame K, sucralose, saccharine, cyclamate, and mixtures thereof, in their soluble salt(s) forms) to the warm yogurt, a more uniformly sweetened end product is obtained especially when aspartame is used as a high potency sweetener. Aspartame dissolves poorly in cooled aqueous products. Also, when the cooling step is practiced employing a shell and tube heat exchanger, the cooling step provides homogeneous blending of the sweetener.

Cooling to Arrest Culturing

In the present method, once the yogurt has reached the targeted acidity level, a typical step is to arrest the yogurt culture growth by cooling the yogurt. When the titratable acidity ("T.A.") is 0.85% to 0.90%, the fermentation is terminated by the cooling step.

Good results are obtained when the yogurt is cooled to a temperature of about 2° to 4° C. (35° to 40° F.), typically about 38° F. to 42° F. and, for best results, about 40° F.

Forming a Blended Yogurt or with "Fruit on the Bottom"

The present method further optionally comprises the step of blending the cooled yogurt immediately thereafter (i.e., without resting) with additives such as fruit and/or fruit puree, colorants, flavorants, high potency sweeteners (e.g., aspartame, acetylsulfame, sucralose, saccharine, cyclamate and mixtures thereof, in the salts), vitamins, minerals, especially calcium salts (e.g., tricalcium phosphate and/or other dispersible calcium salts) to form a yogurt phase in order to enhance consumer acceptance of the product. These additives are typically added after the fermentation step is arrested by cooling. Optionally, but less typically, the high potency sweeteners are added in this step.

Alternatively, fruit and or fruit puree or preserves can be added to a container before the yogurt to prepare a product having fruit on the bottom.

Conventionally, the yogurt is unaerated. That is, the yogurt phase(s) can have a density of from about 0.9 to 1.2 g/cc.

In certain embodiments of the present invention, the stirred style yogurt phase can additionally comprise about 0.1% to 25% of the product of fruit preserves dispersed throughout the yogurt phase. The term "yogurt phase" is used herein broadly to include both the yogurt alone (i.e., with non-fruit additives dispersed or dissolved in the yogurt) or the yogurt (with other additives) mixed with fruit puree.

In addition to yogurts, the waxy cassava ASDA can be used to thicken any of a variety of food products, particularly salad dressings, especially creamy salad dressings, cream sauces, cream soups, as well as fermented or neutral dairy products such as fromage frais, panna cotta, sour cream, puddings, cream pie fillings, cream fruit fillings, custards, flan, imitation cheese and cheese products, or the like.

EXAMPLES

Preparation of Hydroxypropylated Distarch Phosphate and Distarch Phosphate

Hydroxypropylated distarch phosphate (HPDP) experimental samples were prepared using waxy cassava base native starch. Starch bases were treated with propylene oxide (PO) and phosphorus oxychloride ($POCl_3$) by the following reaction conditions. A reaction slurry was prepared by combining 100 parts native starch (as-is basis) to 175 parts water. To the reaction slurry 18%, on the weight of starch, of sodium sulfate ($Na_2SO_4$) salt was added. The alkalinity of the reaction mixture was then raised using 3% sodium hydroxide (NaOH) solution until a 50 mL aliquot was neutralized by 64 mL of 0.1N hydrochloric acid (HCl). The slurry was then transferred to a 1 gallon plastic bottle with O-ring seals. The desired amount of propylene oxide was added to the slurry, based on weight percent of the starch. This bottle was then placed in a heated tumbler which was rotated for sixteen hours while maintaining the tumbler temperature at 40° C. The slurry was then removed from the tumbler into a reaction vessel equipped with an overhead stirrer and stir paddle. The temperature of the slurry was allowed to cool to ~30° C. The desired amount of phosphorus oxychloride ($POCl_3$) was added to the reaction mixture by volume using an automated pipette and allowed to react for thirty minutes. The pH was adjusted to 3.0-3.5 with 25% sulfuric acid ($H_2SO_4$) and allowed to mix for one hour, to ensure neutralization of any residual propylene oxide to propylene glycol. The reaction mixture was then brought to a pH of 5.0-6.0 using 3% NaOH. The starch was recovered by vacuum filtration, washed with water, and dried in an oven overnight at 105° F.

Distarch phosphate experimental samples were prepared using waxy cassava base native starch. Starch base was treated with phosphorus oxychloride by the following reaction conditions. A reaction slurry was prepared by combining 100 parts native starch (as-is basis) to 175 parts water for waxy cassava, 150 parts water for waxy corn, and 125 parts water for regular tapioca. To the reaction slurry 0.5%, on the weight of starch, of sodium chloride (NaCl) salt was added. The alkalinity of the reaction mixture was then raised using 3% NaOH solution until a 50 mL aliquot was neutralized by 25 mL of 0.1N HCl. The desired amount of phosphorus oxychloride was added to the reaction mixture by volume using an automated pipette and allowed to react for thirty minutes. The reaction mixture was then brought to a pH of 5.0-6.0 using a 25% solution of HCl. The starch was recovered by vacuum filtration, washed with water, and dried in an oven overnight at 105° F.

A series of distarch phosphate experimental samples were prepared by following the above procedure for hydroxypropylated distarch phosphate (HPDP) samples, but no propylene oxide was added to the reaction slurry. This set of experimental samples were used as a control to determine the effect of the reaction conditions for hydroxypropylation on the functional performance of the starch.

The experimental design of experiment (DOE) shown in Table 1 was followed to prepare samples of PO/POCL3 modified waxy cassava starch.

TABLE 1

| Starch No. | Propylene Oxide (wt %) | Phosphorus Oxychloride (wt %) |
| --- | --- | --- |
| 1 | 0 | 0.012 |
| 2 | 0 | 0.020 |
| 3 | 0 | 0.030 |
| 4 | 2 | 0.012 |
| 5 | 2 | 0.020 |
| 6 | 2 | 0.030 |
| 7 | 4 | 0.012 |
| 8 | 4 | 0.020 |
| 9 | 4 | 0.030 |

Preparation of Acetylated Distarch Adipate and Distarch Adipate

Acetylated distarch adipate (ASDA) experimental samples were prepared using waxy cassava base native starch. Starch base was treated with acetic anhydride and adipic acetic mixed anhydride by the following reaction conditions. Adipic acetic mixed anhydride, also referred to by its historical manufacturing fill code number 902-21 reagent, was prepared in the lab. In a 500 mL Erlenmeyer flask, 20 g of adipic acid was combined with 180 g of acetic anhydride. The mixture was heated, gradually over an hour to 90° C., in a boiling water bath. Once the mixture reached 90° C., the mixture was held at that temperature for an additional hour. The mixed anhydride (902-21 reagent) was then cooled to room temperature. A reaction slurry was prepared by combining 100 parts native starch (as-is basis) to 175 parts water. The pH of the slurry was adjusted to 7.8-8.2 with a 3% NaOH solution. The desired amount of acetic anhydride and 902-21 reagent was then added to the reaction mixture very slowly, over the time span of approximately one hour. During the addition of the acetic anhydride the pH of the reaction was maintained between 7.8-8.2 with 3% NaOH solution. After complete addition of the acetic anhydride, the pH of the reaction was maintained between 7.8-8.2 for fifteen minutes or until pH had stabilized. The reaction mixture was then brought to a pH of 5.0-6.0 using a 25% HCl solution. The starch was recovered by vacuum filtration, washed with water, and dried in an oven overnight at 105° F.

Distarch adipate experimental samples were prepared using waxy cassava base native starch. Starch base was treated with 902-21 reagent by the following reaction conditions described above, without the addition of acetic anhydride.

The experimental design of experiment (DOE) shown in Table 2 was followed to prepare samples of AA/Adipic waxy cassava starch.

TABLE 2

| Starch No. | Acetic Anhydride (wt %) | Mixed Anhydride (wt %) |
| --- | --- | --- |
| 10 | 0 | 0.4 |
| 11 | 0 | 0.875 |
| 12 | 0 | 1.39 |
| 13 | 2 | 0.4 |
| 14 | 2 | 0.875 |
| 15 | 2 | 1.39 |

Starch Numbers 10-15 were cooked in a model system (90° C. for 20 min. and 85° C. for 10 min.) and analyzed for cook quality by visual observation with a microscope. Acceptable degrees of cook are indicated my moderate granule swelling. Only Starch Numbers 12 and 15 had an acceptable degree of cook. Starch Number 14, for example, had many greatly swollen granules such that it would not survive the shear of homogenization of a yogurt.

Cream Sauce:

Sample preparation and evaluation was performed in the savory application laboratories by L. Drew. The cream soups were prepared following the formula found in the table below.

Cream Soup Formula:

| Ingredient | % | gm |
|---|---|---|
| Water | 78.3 | 1114.5 |
| Whipping Cream | 15 | 225 |
| Starch | 4.6 | 67.5 |
| Sugar | 0.71 | 10.65 |
| Salt | 0.7 | 10.5 |
| Onion Powder | 0.25 | 3.75 |
| Lecithin (Solec F, Solae Co) | 0.5 | 7.5 |
| White Pepper | 0.04 | 0.6 |
| Total | 100 | 1500 |

Water and cream were weighed into a beaker. Using an emersion blender, the emulsifier (Lecithin) was dispersed into the water and cream. The dry ingredients were weighed and blended together, by hand. Dry ingredients were slurried into the water and cream mixture. The slurry was then poured into a THERMOMIX brand mixer (Thermomix, 1964 Corporate Square, Longwood, Fla., USA). Sample was brought to a temperature of 190-195° F., by using speed 1, and held at that temperature until a good cook was reached. Good cooks were determined by in process microscopy.

Yogurt Examples

Modified waxy cassava starches were evaluated in an upstream stirred yogurt process by:
1) Experimental starches were then run through a 7 point Design of Experiment consisting of 3 different preheat temperatures (122, 140, and 158° F.) and 3 different homogenization pressures (725 psi, 2175 psi, and 3625 psi).
2) Full yogurts were made with each experimental starch at preheat 140° F. and homogenization pressure 725 psi and 2175 psi. These yogurts were evaluated for viscosity and gel strength overtime, being measured at 24 hours, 1 week, 3 weeks and 6 weeks.

The yogurts were prepared following the formula found in the table below.

Yogurt Formula:

| Ingredients | % |
|---|---|
| Skim Milk | 95.71 |
| NFDM-Low Heat | 1.34 |
| Gelatin | 0.3 |
| Starch | 2.65 |
| TOTAL | 100 |

The first step was to prepare a pre-blend of dry ingredients formed prior to processing. The dry pre-blend was then added to skim milk in a BREDDO brand Likwifier, Corbion Caravan, 1230 Taney, N. Kansas City, Mo., USA, and mixed for 20-30 minutes at approximately 500 rpm. The mixture was then transferred to a holding tank and then processed through the MicroThermics, Inc., 3216-B Wellington Ct., Raleigh, N.C. 27615, USA, HVHW High-Temperature Short-Time processing equipment, with an upstream process. The pre-heat was adjusted to 122, 140, and 158° F., depending on batch and then homogenized at 725, 2175 or 3625 psi depending on the batch. The mix was then pasteurized at 208° F. and held for 6 minutes. The pasteurized yogurt mix was then allowed to cool to approximately 110° F. Three samples were collected of pasteurized pre-culture mix into 4 oz. jars and used for microscopy, swelling volume, and pre-culture viscosity. In some batches, 0.02% YoFast 16 (Chr. Hansen, Beige Alle 10-12, DK-2970 Horsholm, Denmark) was added and fermented.

In samples that were fermented, the pH was adjusted to 4.6 using cultures. Yogurt was cooled through the MicroThermics glycol chiller tube to approximately 45-55° F. with built in 60 mesh screen. Yogurt was packaged into 4 oz. cups to be used for Brookfield viscosity, TAXT2, and informal sensory was performed.

Yogurts were analyzed using the following methods:
1) Brookfield Measurements (DV-II+Viscometer): Using a Small Sample Adaptor: Viscosity of 12 g of material was measured one, seven, twenty-one, and forty-two days after processing. The sample was measured using Spindle #28 at 30 rpm, for twenty seconds. Samples should be measured when sample is as close to refrigeration temperature as possible. The recorded reading is an average of two measurements.
2) TAXT2 Punch Test: The machine was first calibrated to use yogurt punch test technique and 3.2"×1" diameter acrylic probe. The probe was compressed into yogurt at 0.2 mm/s to a depth of 15 mm. Once it has reached 15 mm, the probe was held in the sample for 200 seconds. The probe was released from yogurt at 2 mm/s rate. Peak force experienced (defined as gel strength) during compression was measured and recorded. Samples were measured one, seven, twenty-one, and forty-two days after processing Yogurt Application Results Starch No. 5, Starch No. 9, and Starch No. 15 were used to prepare yogurts as described above and the results are shown in Table 3, below.

TABLE 3

| Starch No. | Homog. Pressure (psi) | Viscosity (cps) after days shown | | | | Gel Strength (g) after days shown | | | |
|---|---|---|---|---|---|---|---|---|---|
| | | 1 | 7 | 21 | 42 | 1 | 7 | 21 | 42 |
| 5 | 725 | 8616.5 | 10045 | 9374.5 | 10356.5 | 32.4 | 47.51 | 45.98 | 51.31 |
| 5 | 2175 | 9150 | 10021.5 | 10046.5 | 10945 | 39.75 | 44.48 | 47.27 | 52.89 |
| 9 | 725 | 9575 | 9558 | 9906.5 | 10910 | 33.64 | 40.18 | 42.68 | 47.26 |
| 9 | 2175 | 9483 | 9724.5 | 9981.5 | 11780 | 36.45 | 45.48 | 50.43 | 52.06 |
| 15 | 725 | 8649.5 | 9749.5 | 9441.5 | 10115 | 48.34 | 42.84 | 55.14 | 58 |
| 15 | 2175 | 8774.5 | 10346.5 | 10610 | 9674.5 | 48.47 | 53.98 | 55.12 | 55.4 |

In addition, none of the yogurts exhibited syneresis or off-flavors and all exhibited a short, spoonable texture.

The above description is for the purpose of teaching the person of ordinary skill in the art how to practice the present invention, and it is not intended to detail all those obvious modifications and variations which will become apparent to the skilled worker upon reading the description. It is intended, however, that all such obvious modifications and variations be included within the scope of the present invention which is defined by the following claims.

What is claimed is:

1. A thickened food product composition comprising: an aqueous phase comprised from 1% to 7% (by weight of the composition) of a waxy cassava acetyl-substituted adipate-cross-linked starch the waxy cassava acetyl substituted adipate cross-linked starch having from 0.10% to 0.18% by weight adipate groups by weight of the starch and a degree of substitution of from 0.25% to 2.5%, the starch being acetylated and crosslinked in a process using greater than 1% mixed anhydride wherein the food product composition is made in a process comprising subjecting the composition to heat and a shearing pressure greater than 725 psi; wherein the starch thickens the food product composition.

2. A composition as claimed in claim 1 wherein the waxy cassava acetyl-substituted adipate cross-linked starch has from about 0.12% to about 0.16% by weight adipate groups.

3. A composition as claimed in claim 1 wherein the waxy cassava acetyl-substituted inhibited starch is present in the aqueous phase in an amount of about 1% to about 4% by weight of the composition.

4. A composition as claimed in claim 1 wherein the waxy cassava acetyl-substituted inhibited starch is present in the aqueous phase in an amount of about 2% to about 7% by weight of the composition.

5. A method of thickening a food product composition comprising:
a) mixing with an aqueous phase, from 1% to 7% of a waxy cassava acetyl-substituted adipate-cross-linked starch,
b) heating the food composition and subjecting the food composition to a pressure greater than 725 psi, and
c) allowing the food composition to cool
wherein the waxy cassava acetyl substituted adipate cross-linked starch has from 0.10% to 0.18% adipate groups by weight of the starch and a degree of substitution of from 0.25% to 2.5% acetyl by weight: the starch is acetylated and crosslinked in a process using greater than 1% mixed anhydride.

6. A method as claimed in claim 5 wherein the waxy cassava acetyl-substituted adipate cross-linked starch has from about 0.12% to about 0.16% by weight adipate groups.

7. A method as claimed in claim 5 wherein the waxy cassava acetyl-substituted inhibited starch is present in the aqueous phase in an amount of about 1% to about 4% by weight of the composition.

8. A method as claimed in claim 5 wherein the waxy cassava acetyl-substituted inhibited starch is present in the aqueous phase in an amount of about 2% to about 7% by weight of the composition.

9. A thickened food product composition comprising: an aqueous phase comprised of a waxy cassava propylene oxide-substituted di-starch phosphate in an amount 1% and 7% by weight of the composition, wherein said waxy cassava propylene oxide-substituted di-starch phosphate has greater than about 0.012% phosphate groups by weight of the starch; and about 2% propylene oxide groups by weight of the starch; wherein the food product composition is made in a process comprising heating the composition and subjecting it to a shearing pressure of at least 725 psi wherein the starch thickens the food composition.

10. A method of thickening a food product composition comprising:
a) mixing with an aqueous phase, a waxy cassava propylene oxide-substituted di-starch phosphate in an amount of from 1% to 7% (by weight of the composition),
b) heating the food product composition and subjecting the composition to a pressure of at least 725 psi; and
c) allowing the food product composition to cool;
wherein said waxy cassava propylene oxide-substituted di-starch phosphate has greater than about 0.012 by weight phosphate groups by weight of the starch; and about 2% propylene oxide groups by weight of the starch.

* * * * *